(12) United States Patent
Lee

(10) Patent No.: US 7,503,531 B2
(45) Date of Patent: Mar. 17, 2009

(54) HEIGHT ADJUSTING MECHANISM

(75) Inventor: Yu-Chi Lee, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 276 days.

(21) Appl. No.: 11/552,985

(22) Filed: Oct. 26, 2006

(65) Prior Publication Data
US 2007/0120033 A1 May 31, 2007

(30) Foreign Application Priority Data
Nov. 17, 2005 (TW) .............................. 94140405 A

(51) Int. Cl.
*F16M 11/24* (2006.01)
(52) U.S. Cl. .............. 248/188.2; 248/188.4; 248/188.8; 248/188.9; 248/650; 411/402; 411/408; 254/103
(58) Field of Classification Search .............. 248/188.2, 248/188.4, 188.8, 346.05, 677, 188.9, 649, 248/650, 354.3, 354.4; 411/402, 408, 409, 411/399, 437; 254/103
See application file for complete search history.

(56) References Cited
U.S. PATENT DOCUMENTS

| | | | | |
|---|---|---|---|---|
| 324,917 A * | 8/1885 | Cashin | .................... | 248/188.4 |
| 809,078 A * | 1/1906 | Seymour | .................. | 248/188.4 |
| 934,546 A * | 9/1909 | Kovacs | ..................... | 248/188.2 |
| 1,387,390 A * | 8/1921 | Haggenmiller | ........... | 248/188.4 |
| 1,417,639 A * | 5/1922 | Sterner | ..................... | 248/188.4 |
| 1,632,383 A * | 6/1927 | Seiden et al. | ............. | 248/188.4 |
| 2,803,510 A * | 8/1957 | Carbary | ................. | 312/351.13 |
| 4,459,813 A * | 7/1984 | Petta | ............................ | 62/132 |
| 5,292,095 A * | 3/1994 | Cattaneo | .................. | 248/188.4 |
| 6,729,590 B2 * | 5/2004 | Gabriel | ..................... | 248/188.2 |

* cited by examiner

*Primary Examiner*—Kimberly Wood
(74) *Attorney, Agent, or Firm*—Jianq Chyun IP Office

(57) ABSTRACT

A height adjusting mechanism suitable for a keyboard is provided, and the keyboard is placed on a flat surface and has a casing. The height adjusting mechanism includes a fixing piece, a cylinder, a first gear and a second gear. The fixing piece is disposed on the casing and has a container and at least a supporting part that extends into the container. The cylinder has at least a spiral guide on its sidewall and the supporting part slides along the spiral guide when the cylinder rotates. In addition, the first gear is assembled to the cylinder so that the first gear and the cylinder can rotate simultaneously. The second gear and the first gear are meshed with each other so that the second gear can drive and rotate the first gear to adjust the relative distance between the casing and the bottom of the cylinder.

10 Claims, 3 Drawing Sheets

HEIGHT ADJUSTING MECHANISM

CROSS-REFERENCE TO RELATED APPLICATION

This application claims the priority benefit of Taiwan application serial no. 94140405, filed on Nov. 17, 2005. All disclosure of the Taiwan application is incorporated herein by reference.

BACKGROUND OF THE INVENTION

1. Field of the Invention

The present invention relates to a height adjusting mechanism. More particularly, the present invention relates to a height adjusting mechanism for keyboard.

2. Description of the Related Art

In the information age, computers have become an indispensable part of our life. The commonly used computers such as the desktop computers, the notebook computers and tablet computers all have a keyboard to facilitate data input. When a user needs to input data, edit documents or draft graphs, providing a keyboard that can be comfortably operated on is very important. Conventionally, to provide some degree of comfort in typing, leg pads are normally attached to the underside of the keyboard and the keyboard is set at an inclined angle facing the user. In the following, a conventional method of adjusting the height of the keyboard is described.

FIG. 1 is a schematic diagram of a conventional keyboard. As shown in FIG. 1, the conventional keyboard 10 includes a casing 100 and a plurality of keys (not shown). The keys are disposed inside the casing 100 so that a user can input data through the keys. Leg pads 100a are attached to the bottom of the casing 100. Through the thickness of these leg pads 110a, the keyboard 10 can be tilted to a predefined angle so that the user can type in a more comfortable and resting wrist position. Accordingly, a conventional keyboard only provides the user with a fixed angle of tilt through a set of leg pads 110a with a specific height. The leg pads 110a however have a fixed height. In other words, the tilted angle of the keyboard 10 is fixed once a fixed set of leg pads 110a is used. Hence, the tilted angle of the conventional keyboard 10 can not be adjusted to suit the demand of a particular user.

SUMMARY OF THE INVENTION

Accordingly, at least one objective of the present invention is to provide a height adjusting mechanism to adjust the angle of tile of a keyboard.

To achieve this and other advantages and in accordance with the purpose of the invention, as embodied and broadly described herein, the invention provides a height adjusting mechanism suitable for a keyboard. A casing of the keyboard is placed on a flat surface. The height adjusting mechanism includes a fixing piece, a cylinder, a first gear and a second gear. The fixing piece is fixed on the casing and has a container and at least a supporting part. The container passes through the casing and the supporting part is disposed on the inner wall of the container. A portion of the cylinder is disposed inside the container and the cylinder has a spiral guide on its sidewall. The supporting part movably fits with the spiral guide and can slide along the spiral guide when the cylinder rotates so that the length of the cylinder extending into the container can be changed. In addition, the first gear is fixed to the cylinder. The second gear and the first gear are meshed together. The second gear can drive and rotate the first gear and the cylinder so that the supporting part slides along the spiral guide for changing the length of the cylinder protruded from the casing. The end of the cylinder protruded from the casing will be in contact with the flat surface.

In one embodiment of the present invention, at least a portion of the second gear is exposed outside of the casing.

In one embodiment of the present invention, the first gear has a thickness greater than the second gear.

In one embodiment of the present invention, the spiral guide has a positioning region. When the supporting part slides along the positioning region, a fixed relative distance is maintained between the bottom surface of the cylinder and the fixing piece.

In one embodiment of the present invention, the fixing piece and the casing can be a single integrated unit.

In one embodiment of the present invention, the casing may have an opening that exposes a portion of the second gear.

In one embodiment of the present invention, the cylinder and the first gear can be a single integrated unit.

In one embodiment of the present invention, the cylinder may have a first engaging part at one end and the first gear has a second engaging part. The first gear is assembled with the first engaging part of the cylinder through the second engaging part.

In one embodiment of the present invention, the first engaging part may be a protrusion and the second engaging part may be a cavity.

In one embodiment of the present invention, the first engaging part may be a cavity and the second engaging part may be a protrusion.

In one embodiment of the present invention, the supporting part may have a hemispherical shape.

In brief, the height adjusting structure in the present invention uses a set of gears to drive and rotate a cylinder so that the distance between the casing and the bottom surface of the cylinder can be adjusted. Therefore, the user can adjust the keyboard to whatever angle of tilt desired through the height adjusting mechanism.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
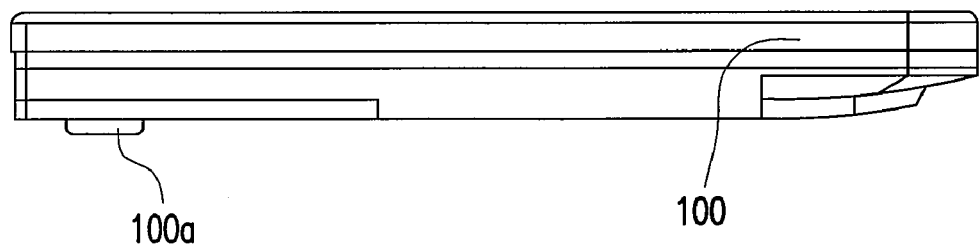
FIG. 1 is a schematic diagram of a conventional keyboard.

Reference will now be made in detail to the present preferred embodiments of the invention, examples of which are illustrated in the accompanying drawings. Wherever possible, the same reference numbers are used in the drawings and the description to refer to the same or like parts.

Figure 2:
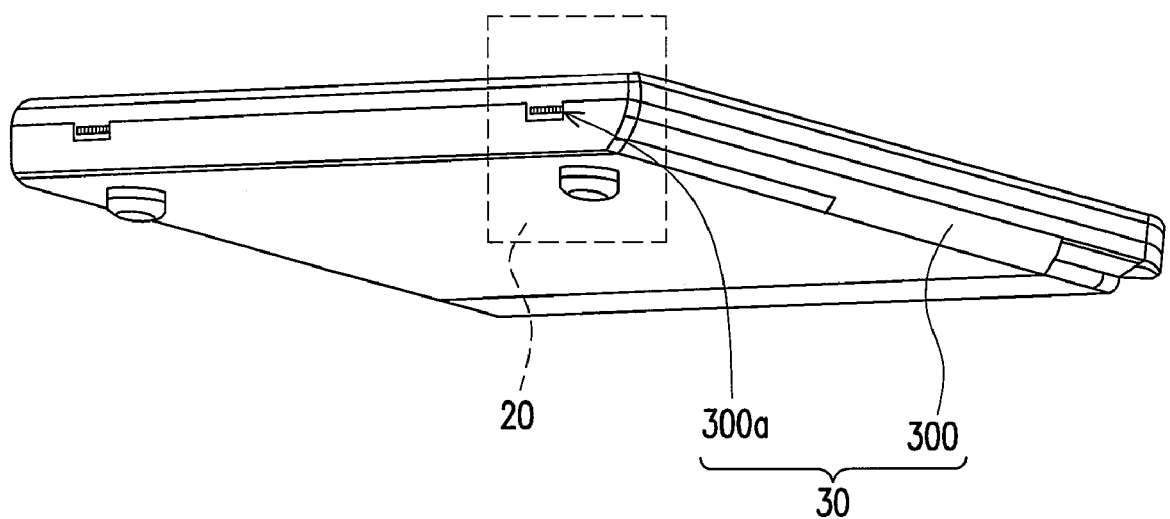
FIG. 2 is a perspective view of a height adjusting mechanism applied to a keyboard according to one embodiment of the present invention.

FIG. 2 is a perspective view of the height adjusting mechanism applied to a keyboard according to one embodiment of the present invention. As shown in FIG. 2, the height adjusting mechanism 20 in the present embodiment is applied to a keyboard 30. Through the height adjusting mechanism 20, a user can adjust the keyboard 30 to a suitable height and angle of tilt. Moreover, the keyboard 30 can be the keyboard of a desktop computer, of a notebook computer, or of other electronic devices. The keyboard 30 has a plurality of keys (not shown) and a casing 300. The keys are disposed within the casing 300 so that user can input data through the keyboard. Furthermore, the casing 300 has an opening 300a that exposes a portion of the height adjusting mechanism 20.

Figure 3A:
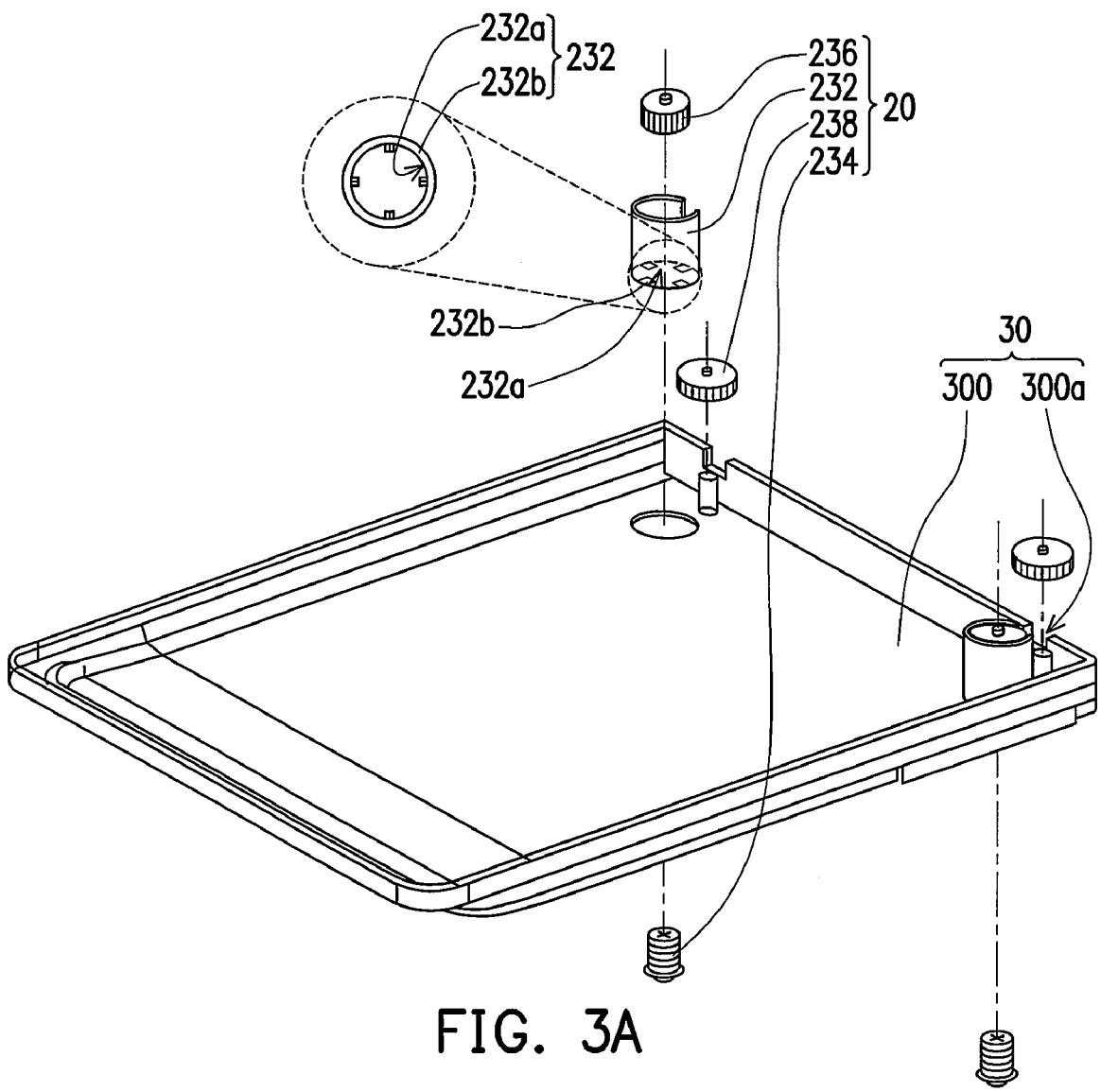
FIG. 3A is an explosion view showing various components of a height adjusting mechanism according to one embodiment of the present invention.
Figure 3B:
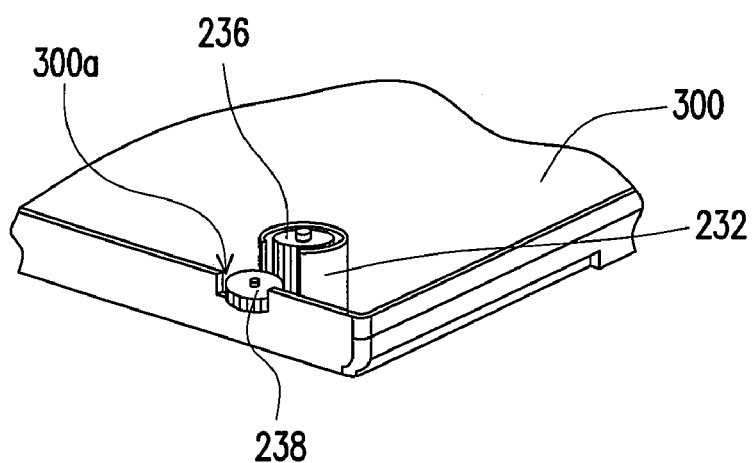
FIG. 3B is a perspective view showing an assembled height adjusting mechanism according to one embodiment of the present invention.
Figure 3C:
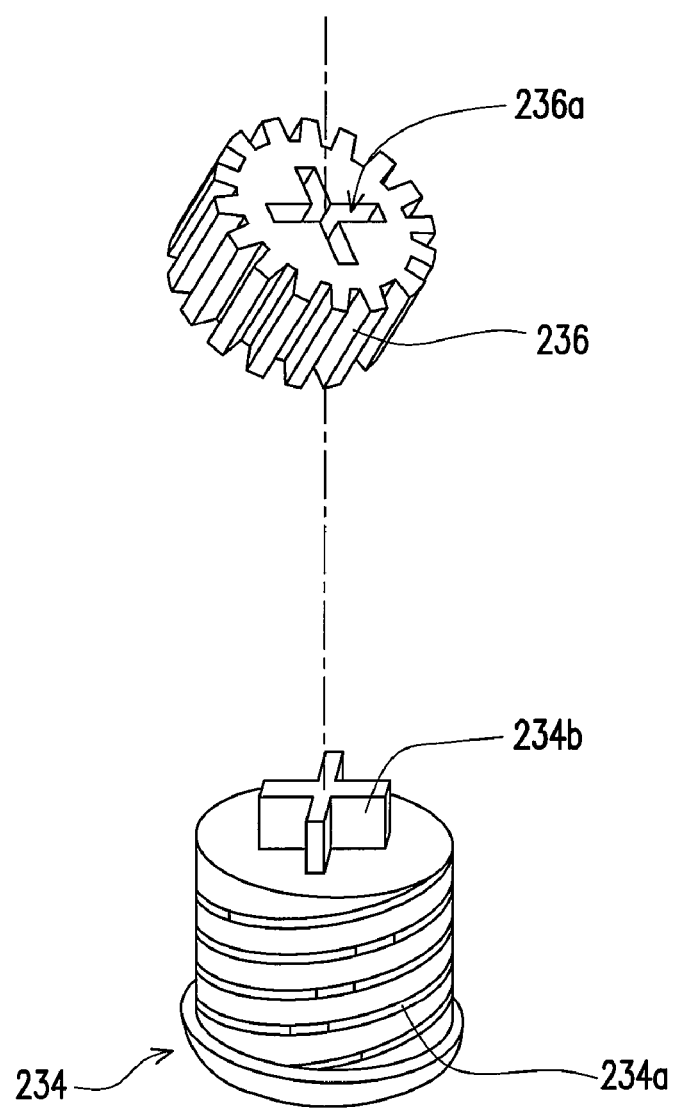
FIG. 3C is a perspective view of the first gear and the cylinder in FIG. 3A.

FIG. 3A is an explosion view showing the components of the height adjusting mechanism according to one embodiment of the present invention. FIG. 3B is a perspective view showing an assembled height adjusting mechanism according to one embodiment of the present invention. FIG. 3C is a perspective view of the first gear and the cylinder in FIG. 3A. As shown in FIGS. 3A, 3B and 3C, the height adjusting mechanism 20 includes a fixing piece 232, a cylinder 234, a first gear 236 and a second gear 238. The fixing piece 232 is disposed on the casing 300 of the keyboard 30. The fixing piece 232 has a container 232a and at least a supporting part 232b that extends into the interior of the container 232a. In the present embodiment, the supporting part 232b has a hemispherical shape. However, the supporting part 232b can be cylindrical or some other shape. Furthermore, the present embodiment does not fix the location of the supporting parts 232b or the number of supporting parts 232b used in the casing 300. For example, four supporting parts 232b are preferably used and the supporting part 232b is preferably coplanar with the bottom surface of the casing 300. In the present embodiment, the fixing piece 232 and the casing 300 are formed as a single integrated unit. Yet, the fixing piece 232 and the casing 300 can be separately formed components.

The cylinder 234 has a spiral guide 234a on its sidewall and an engaging part 234b at one end. More specifically, the cylinder 234 is disposed inside the fixing piece 232 and passes through the container 232a. In addition, the supporting part 232b is flushed into the spiral guide 234a. Hence, when the cylinder 234 rotates, the distance between the bottom part of the cylinder 234 and the casing 300 will change. Furthermore, the first gear 236 is fixed inside the fixing piece 232 and the first gear 236 has a second engaging part 236a. After engaging the second engaging part 236a of the first gear 236 and the first engaging part 234b of the cylinder 234 together, the first gear 236 and the cylinder 234 can rotate simultaneously.

In the present embodiment, the first engaging part 234b is a protruded cross and the second engaging part 236a is a cross-shaped groove. However, in another embodiment, the first engaging part 234b can be a cross-shaped groove and the second engaging part 236a can be a protruded cross. Alternatively, the first engaging part 234b can be a protruded dash and the second engaging part 236a can be a linear groove. In other words, the first engaging part 234b and the second engaging part 236a can have any structures that engage with each other. Furthermore, when the first gear 236 rotates, the first gear 236 drives and rotates the cylinder 234. It should be noted that the first gear 236 and the cylinder 234 are independent components. However, the first gear 236 and the cylinder 234 can also be formed as a single integrated unit.

The second gear 238 and the first gear 236 are meshed with each other. Furthermore, the first gear 236 has a thickness greater than the second gear 238. The second gear 238 is suitable for driving the first gear 236 and setting it into rotation. More specifically, an opening 300a in the casing 300 exposes a portion of the second gear 238. Therefore, when the user rotates the exposed part of the second gear 238, the second gear 238 will drive the first gear 236 and rotate the cylinder 234 through its engagement with the first gear 236. When the cylinder 234 rotates, the supporting part 232b of the fixing piece 232 will slide along the spiral guide 234a on the sidewall of the cylinder 234. As a result, the relative distance between the casing 300 and the bottom surface of the cylinder 234 will change to correspond with the rotation. In other words, by rotating the second gear 238, the user can change the angle of tilt of the casing 300 and hence the keyboard 30 so that each user can adjust the angle of tilt to a desired degree.

Figure 4:
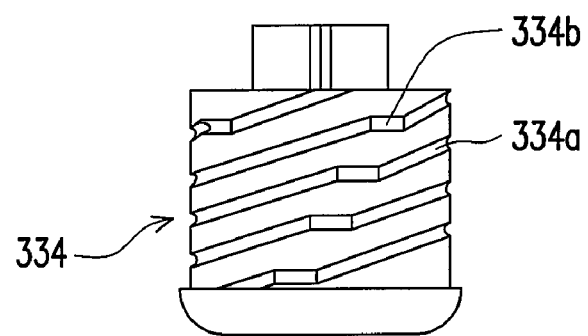
FIG. 4 is a side view of another cylinder according to one embodiment of the present invention.

FIG. 4 is a side view of another cylinder according to one embodiment of the present invention. As shown in FIGS. 4 and 3A, the cylinder 334 in FIG. 4 is quite similar to the cylinder 234 in FIG. 3C. One major difference is that the spiral guide 334a of the cylinder 334 has positioning regions 334b and each positioning region 334b is separated from the bottom surface of the cylinder 334 by a predefined distance. When the supporting part 232b slides within one of these positioning regions 334b, the distance from the bottom surface of the cylinder 334 to the casing 300 is fixed. In other words, a different positioning region 334b represents a different tilt angle for the keyboard. Thus, the keyboard can have a number of preset tilting angles. Consequently, a user can select the most suitable tilting angle of the keyboard 30.

In summary, the advantages of the height adjusting mechanism in the present invention at least include:

1. Through the height adjusting mechanism, the user can adjust the tilt of the keyboard to the most suitable angle.
2. Because the tilting angle of the keyboard of a notebook computer can be adjusted, the space between the bottom surface of the keyboard and the positioning surface can be increased. As a result, the heat dissipation of the notebook computer can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A height adjusting mechanism for a keyboard, wherein the keyboard comprises a casing which is adapted for being disposed on a flat surface, the height adjusting mechanism being adapted for adjusting a height of the casing from the flat surface, and comprising:

a fixing piece fixed onto the casing and comprising a container and at least a supporting part, wherein the container passes through the casing and the supporting part is disposed on the inner wall of the container;

a cylinder having at least a portion disposed inside the container, wherein the cylinder has a spiral guide configured at an sidewall thereof and the supporting part forms a sliding engagement with the cylinder;

a first gear fixed to an end face of the cylinder; and a second gear meshed with the first gear, wherein rotating the second gear will drive and rotate the first gear and the cylinder so that the supporting part will slide along the spiral guide to change the length of the cylinder protruded from the casing, and an end of the cylinder protruded from the casing is in contact with the flat surface.

2. The height adjusting mechanism of claim 1, wherein at least a portion of gear teeth of the second gear are exposed outside of the casing.

3. The height adjusting mechanism of claim 1, wherein the first gear has a thickness greater than the second gear.

4. The height adjusting mechanism of claim 1, wherein the spiral guide has a positioning region such that a fixed distance between the cylinder and the fixing piece is maintained when the supporting part slides within the positioning region.

5. The height adjusting mechanism of claim 1, wherein the fixing piece and the casing are formed together as an integrated unit.

6. The height adjusting mechanism of claim 1, wherein the cylinder and the first gear are formed together as an integrated unit.

7. The height adjusting mechanism of claim 1, wherein the cylinder has a first engaging part at one end and the first gear has a second engaging part such that the first gear is fixed to the first engaging part of the cylinder through the second engaging part.

8. The height adjusting mechanism of claim 7, wherein the first engaging part is a protrusion and the second engaging part is a cavity.

9. The height adjusting mechanism of claim 7, wherein the first engaging part is a cavity and the second engaging part is a protrusion.

10. The height adjusting mechanism of claim 1, wherein the supporting part has a hemispherical shape.

* * * * *